United States Patent
Minor et al.

(10) Patent No.: US 8,418,481 B2
(45) Date of Patent: Apr. 16, 2013

(54) SECONDARY LOOP COOLING SYSTEM HAVING A BYPASS AND A METHOD FOR BYPASSING A RESERVOIR IN THE SYSTEM

(75) Inventors: Barbara Haviland Minor, Elkton, MD (US); Mack McFarland, West Grove, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 389 days.

(21) Appl. No.: 12/809,398

(22) PCT Filed: Dec. 18, 2008

(86) PCT No.: PCT/US2008/087404
§ 371 (c)(1),
(2), (4) Date: Jun. 18, 2010

(87) PCT Pub. No.: WO2009/085937
PCT Pub. Date: Jul. 9, 2009

(65) Prior Publication Data
US 2011/0197604 A1    Aug. 18, 2011

Related U.S. Application Data

(60) Provisional application No. 61/015,445, filed on Dec. 20, 2007.

(51) Int. Cl.
*F25B 7/00* (2006.01)
(52) U.S. Cl.
USPC ................................. 62/79; 62/335
(58) Field of Classification Search ............. 62/79, 185, 62/197, 335, DIG. 2
See application file for complete search history.

(56) References Cited

U.S. PATENT DOCUMENTS

| | | | |
|---|---|---|---|
| 4,724,678 A * | 2/1988 | Pohl | 62/80 |
| 5,598,716 A | 2/1997 | Tanaka et al. | |
| 5,761,908 A * | 6/1998 | Oas et al. | 62/3.2 |
| 5,816,455 A * | 10/1998 | Alpers et al. | 222/388 |
| 6,014,325 A * | 1/2000 | Pecore | 363/126 |
| 6,622,503 B1 * | 9/2003 | Bennett et al. | 62/186 |
| 7,569,170 B2 | 8/2009 | Minor | |
| 7,900,465 B2 * | 3/2011 | Wetekamp et al. | 62/187 |
| 8,141,375 B2 * | 3/2012 | Malpetti | 62/187 |
| 2005/0165527 A1 * | 7/2005 | Gorman et al. | 701/36 |
| 2006/0021365 A1 * | 2/2006 | Cushman et al. | 62/187 |

(Continued)

FOREIGN PATENT DOCUMENTS

| | | |
|---|---|---|
| DE | 20 2004 002 160 U1 | 5/2004 |
| EP | 1 153 776 A2 | 11/2001 |
| FR | 2 851 503 A1 | 8/2004 |

OTHER PUBLICATIONS

PCT International Search Report and Written Opinion dated May 8, 2009.
Lubricants in Refrigeration Systems, 1990 ASHRAE Handbook, Refrigeration Systems and Application, Chapter 8, pp. 8.1-8.21, Atlanta, Georgia.
Synthetic Lubricants and High Performance Fluids, Edited by Ronald L. Shubkin, Chapter 2, Esters, pp. 41-65, Chapter 4, Polyalkylene Glycols, pp. 101-123, Marcel Dekker Inc., 1993, New York, New York.

*Primary Examiner* — Mohammad Ali (57) ABSTRACT

An air conditioning or refrigeration system includes a secondary loop cooling system for use with a vapor compression system having a bypass line in order to bypass a reservoir in the secondary loop system. This bypass allows the air conditioning or refrigeration system to cool down more quickly. The secondary loop cooling system uses a non-flammable cooling fluid, which is particularly useful when the refrigerant used in the vapor compression system is flammable.

19 Claims, 3 Drawing Sheets

U.S. PATENT DOCUMENTS

2006/0218946 A1* 10/2006 Davern et al. .................. 62/155
2006/0243944 A1    11/2006 Minor
2006/0243945 A1    11/2006 Minor et al.
2007/0012054 A1*  1/2007 Schenk et al. ................. 62/208

* cited by examiner

SECONDARY LOOP COOLING SYSTEM HAVING A BYPASS AND A METHOD FOR BYPASSING A RESERVOIR IN THE SYSTEM

BACKGROUND OF THE INVENTION

1. Field of the Invention

The present invention relates to a secondary loop cooling system for use with a vapor compression air conditioning system, and a method for bypassing a reservoir in such a system. In particular, the cooling system uses a non-flammable cooling fluid, which is particularly useful when the refrigerant used in the vapor compression system is flammable.

2. Description of Related Art

New environmental regulations on working fluids have forced the refrigeration and air-conditioning industry to look for new working fluids with low global warming potential (GWP). Replacement working fluids are being sought that have low GWP, no toxicity, non-flammability, reasonable cost and excellent performance.

Figure 1:
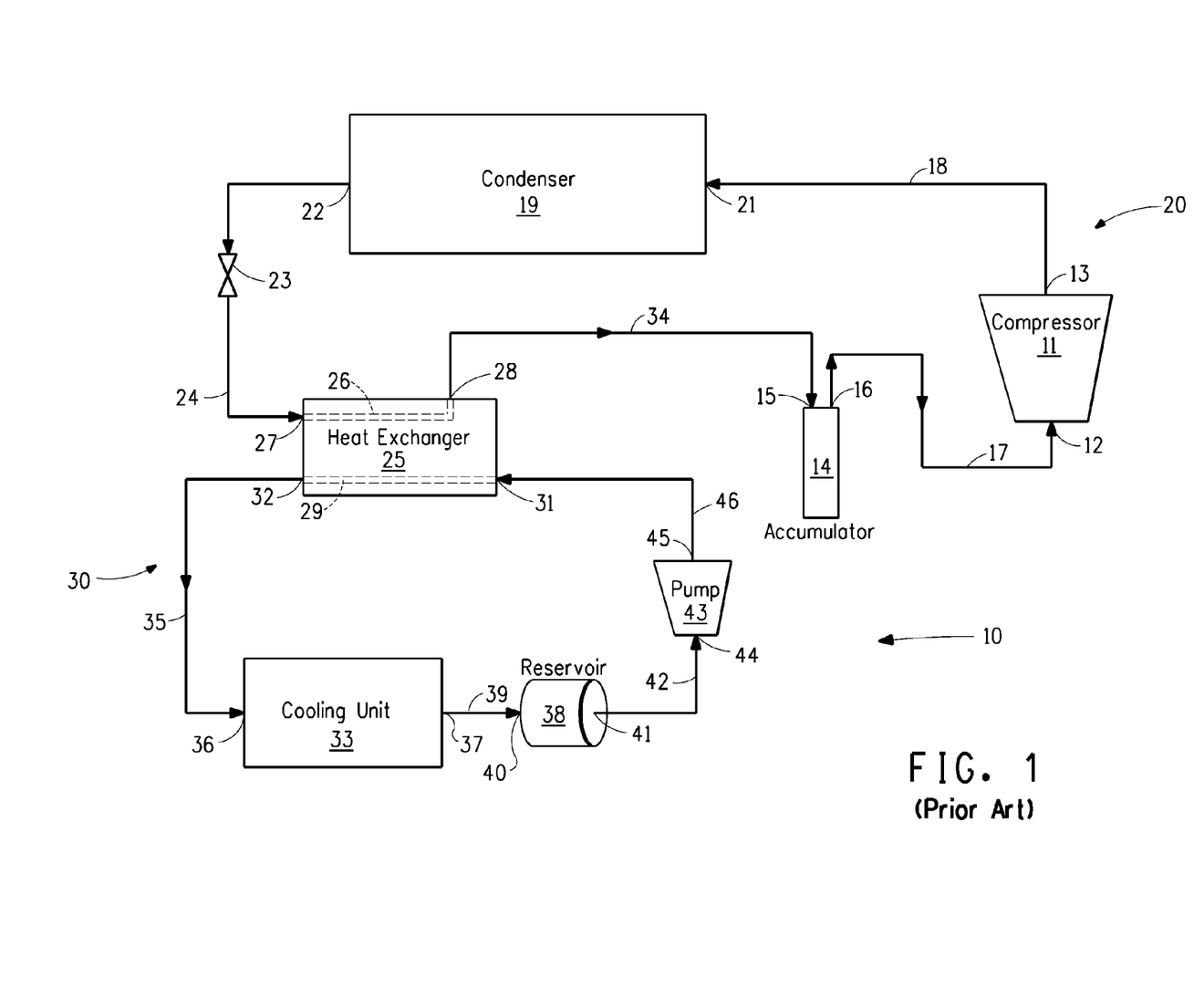
FIG. 1 is a schematic diagram a known secondary loop system for use in an air conditioning system in an automobile in accordance with the prior art.

HFC-152a (1-1) difluoroethane, a flammable refrigerant, is being considered for a secondary loop system in a mobile air conditioning system to prevent it from leaking into the passenger compartment. Such secondary loop systems are known. A typical, known mobile air conditioning system is shown in FIG. 1. This system, shown generally at 10, includes a primary vapor compression system, which may be used as a mobile air conditioning system, shown generally at 20 in FIG. 1, and a secondary loop cooling system, shown generally at 30 in FIG. 1. With reference to FIG. 1, the vapor compression system includes a compressor 11 having an inlet 12 and an outlet 13, and an optional accumulator 14 having an inlet 15 and an outlet 16. A connecting line 17 connects the accumulator and the compressor. If the accumulator is used, it separates any liquid which is not evaporated in the heat exchanger and prevents the liquid from entering the compressor. A gaseous refrigerant flows from outlet 16 of accumulator 14 and through connecting line 17 to an inlet 12 of compressor 11, where the gaseous refrigerant is compressed to a higher pressure. Outlet 13 of the compressor is connected by a connecting line 18 to a condenser 19, which has an inlet 21 and an outlet 22. The compressed gaseous refrigerant is circulated from line 18 to inlet 21 and through the condenser, thus giving off heat, and is converted to a liquid in the condenser. The liquid refrigerant is circulated to outlet 22 of the condenser and through an expansion device in a connecting line 24 which connects the condenser to a chiller, or heat exchanger, 25, which is part of the cooling system 30. Heat exchanger 25 includes a first expansion coil, or tube, 26 having an inlet 27 and an outlet 28. The refrigerant circulates from inlet 27, through the expansion coil, and to outlet 28. The liquid refrigerant flows through the first expansion coil of the heat exchanger and expands. Heat exchanger 25 also includes a second expansion coil, or tube, 29 having an inlet 31 and an outlet 32 for circulating a cooling solution therethrough. The liquid refrigerant evaporates in the heat exchanger at a low temperature to form a low pressure gas and thus produces cooling of the cooling solution. Outlet 28 of the first expansion coil of the heat exchanger is connected by a connecting line 34 to inlet 15 of the accumulator. The low-pressure refrigerant gas from the heat exchanger enters the compressor where the gas is compressed to raise its pressure and temperature, and the cycle then repeats.

The cooling solution in second expansion coil 29 of the heat exchanger is circulated from outlet 32 of the second expansion coil through a connecting line 35 to a cooling unit 33, which has an inlet 36 and an outlet 37. The cooling solution is circulated to inlet 36 of the cooling unit, through the cooling unit and to outlet 37 thereof. The cooling unit is located in the passenger compartment. A fan, not shown, is disposed outside of the cooling unit, and the air from the fan passing across the cooling unit provides cooling to the passenger compartment. The cooling solution is then circulated to a reservoir 38 via a connecting line 39. The reservoir has an inlet 40 and an outlet 41. The cooling solution is pumped to inlet 40, through the reservoir, and to outlet 41 and out of the reservoir to a pump 43 through a connecting line 42, which connects the reservoir and the pump. The pump has an inlet 44 and an outlet 45, and the cooling fluid flows from inlet 44 through the pump to outlet 45 and is pumped back to inlet 31 of the second expansion coil of the heat exchanger via a connecting line 46.

One of the drawbacks with such a secondary loop system is the relatively slow cool down of the passenger compartment of an automobile, especially on a hot day as compared to use of only a primary vapor compression system, such as that shown at 20 in FIG. 1. Therefore, there exists a need to expedite the cooling of the passenger compartment of an automobile with a secondary loop cooling system.

SUMMARY OF THE INVENTION

In order to overcome the drawbacks of the secondary loop cooling system of the prior art, it has been found that by bypassing the reservoir in a secondary cooling system, the passenger compartment of an automobile may be cooled down more quickly than without such a bypass. The reservoir in the secondary loop system can be bypassed until the passenger compartment is cooled, and then the contents of the reservoir can be subsequently cooled.

Such a bypass system is applicable to stationary, as well as mobile, air conditioning or refrigeration systems, where a secondary loop is employed.

Therefore, in accordance with the present invention, there is provided an air conditioning or refrigeration system including a secondary cooling loop system, comprising a heat exchanger having a first expansion coil for circulating a refrigerant therethrough and a second expansion coil for circulating a cooling solution therethrough, a cooling unit for cooling the solution as it circulates therethrough, the cooling unit having an inlet and an outlet, wherein the inlet is in fluid communication with the second expansion coil of the heat exchanger, and further wherein the cooling unit is adapted to be disposed in an area to be cooled; a reservoir for storing the solution, the reservoir having an inlet and an outlet, wherein the inlet is disposed in fluid communication with outlet of the cooling unit; a return line for circulating the stored solution from the reservoir back to the heat exchanger, a by-pass line disposed between the outlet of the cooling unit and the inlet of the heat exchanger for bypassing the reservoir and delivering the solution directly from the outlet of the cooling unit to the inlet of the second tube of the heat exchanger; and a first valve disposed in the bypass line between the outlet of the cooling unit and the inlet of the heat exchanger, wherein the first valve opens to deliver the solution directly from the outlet of the cooling unit to the inlet of the heat exchanger, thereby bypassing the reservoir.

Further in accordance with the present invention, there is provided a method for bypassing a reservoir in a secondary cooling loop system, comprising: circulating a refrigerant through a first expansion coil of a heat exchanger; circulating a cooling solution through a second expansion coil of the heat exchanger; cooling the cooling solution as it circulates through a cooling unit, wherein the cooling unit is disposed in fluid communication with the second expansion coil of the heat exchanger, and further wherein the cooling unit is adapted to be disposed in the area to be cooled; opening a first valve disposed in a bypass line disposed between the outlet of the cooling unit and the inlet of the second expansion coil of the heat exchanger to deliver the solution directly from the outlet of the cooling unit to the inlet of the second expansion coil of the heat exchanger, thereby bypassing the reservoir; and circulating the solution from the by-pass line back to the inlet of the second expansion coil of the heat exchanger.

BRIEF DESCRIPTION OF THE DRAWINGS

The present invention may be better understood with reference to the following figures, wherein.

DETAILED DESCRIPTION OF THE INVENTION

The present invention provides for an air conditioning or refrigeration system including a secondary loop cooling system for use with a vapor compression system, which together can be used in an air conditioning system of an automobile. Such an air conditioning or refrigeration system is shown generally at 110 in FIG. 2, and includes a vapor compression system, shown generally at 120 in FIG. 2, and a secondary loop cooling system, shown generally at 130 in FIG. 2. Such a system is similar to that shown in FIG. 1, with like elements designated with similar reference numerals, except that in FIG. 2, such like elements are designated by a 100-series reference numeral.

Figure 2:
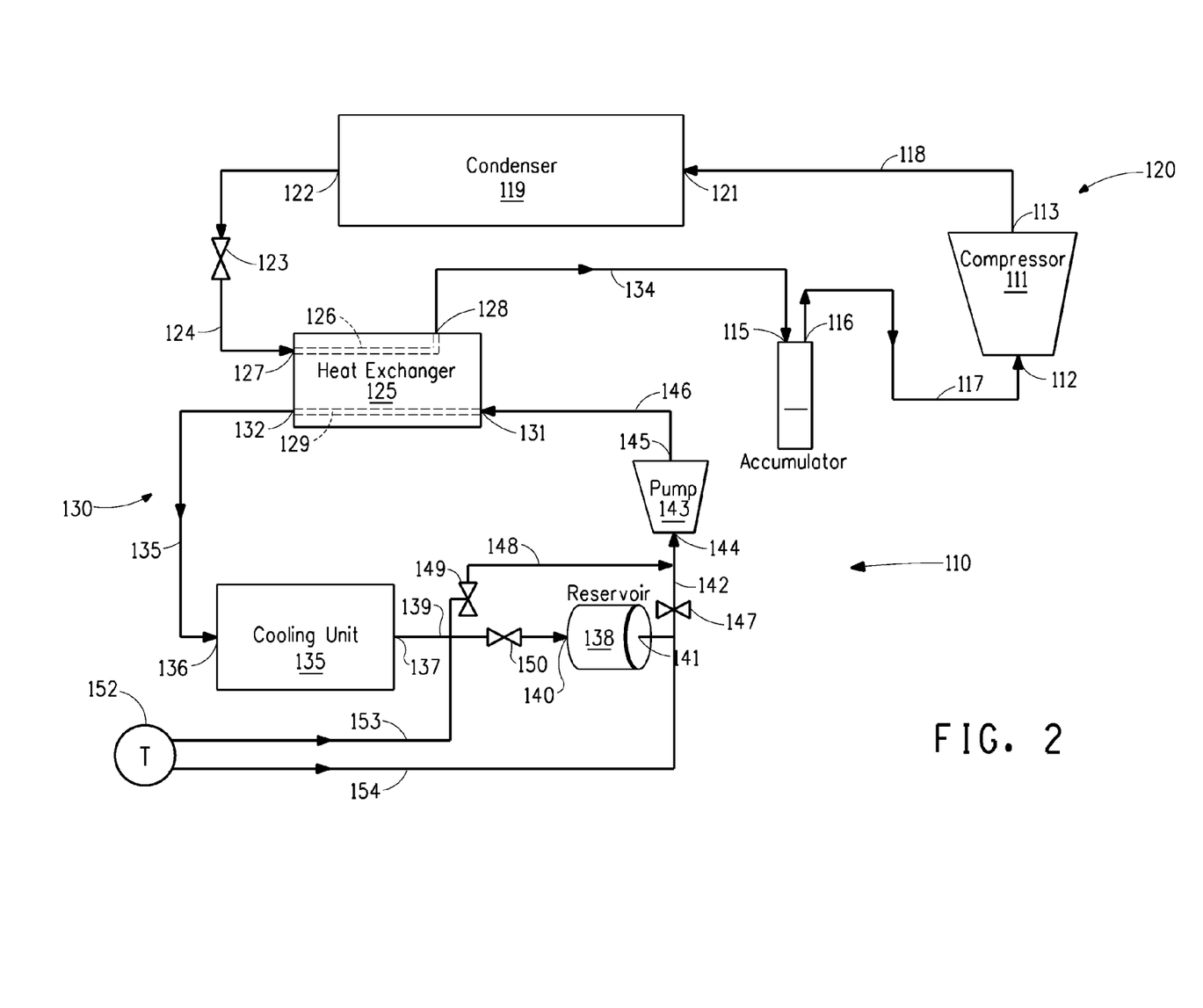
FIG. 2 is a schematic diagram of a secondary loop system for use in an air conditioning system in an automobile in accordance with the present invention which uses a single evaporator.

The secondary loop cooling system of the present invention includes heat exchanger means having a first expansion coil for circulating a refrigerant therethrough and a second expansion coil for circulating a cooling solution therethrough. The heat exchanger means comprises a heat exchanger, which may be referred to as a chiller, or any means for exchanging heat between two fluids. A heat exchanger 125 is shown in FIG. 2 and includes a first expansion coil, or tube, 126 having an inlet 127 and an outlet 128. A refrigerant circulates through the first expansion coil as part of a vapor compression system, which will be described below. Heat exchanger 125 also includes a second expansion coil 129, having an inlet 131 and an outlet 132, for circulating a cooling solution therethrough to a cooling coil, or unit, in the passenger compartment. In one embodiment, the heat exchanger may be a counter-current heat exchanger. In such a heat exchanger, the refrigerant is circulated in the first expansion coil in one direction, and the cooling solution is circulated through the second expansion coil in the opposite direction.

The secondary loop cooling system of the present invention also includes cooling unit means for cooling the solution after it exits the heat exchanger means. The cooling means may comprise a cooling unit, such as cooling unit 133, as shown in FIG. 2. The cooling unit has an inlet 136 and an outlet 137. Inlet 136 is in fluid communication with the second expansion coil of the heat exchanger, specifically with outlet 137 of the second expansion coil, so that the cooling fluid flows from the heat exchanger to the cooling unit. The cooling unit is adapted to be disposed in the vicinity of a body to be cooled, such as the passenger compartment of an automobile in mobile air conditioning applications, or a body which is cooled in a stationary air conditioning or refrigeration application.

The secondary loop cooling system of the present invention also includes reservoir means for storing the cooling solution. The reservoir means may comprise a reservoir, or tank, such as a reservoir 138 as shown in FIG. 2. Reservoir 138 has an inlet 140 and an outlet 141. A connecting line 139 is disposed between the outlet of the cooling unit and the inlet of the reservoir. The inlet of the reservoir is disposed in fluid communication with outlet 137 of the cooling unit via connecting line 139, so that the cooling fluid flows from the cooling unit to the reservoir.

The secondary loop cooling system of the present invention also includes means for circulating the stored solution from the reservoir back to the heat exchanger means. In the embodiment of FIG. 2, the circulating means may comprise a pump, such as pump 143, and a connecting line 142 and a connecting line 146. Pump 143 has an inlet 144 disposed in fluid communication with outlet 141 of the reservoir and an outlet 145 disposed in fluid communication with the heat exchanger. Connecting line 142 connects the reservoir and the pump. The outlet 145 of pump 143 is in fluid communication with inlet 131 of the second expansion coil of the heat exchanger via connecting line 146.

The secondary loop cooling system of the present invention also includes by-pass means for bypassing the reservoir and delivering the cooling solution directly from the outlet of the cooling unit to the inlet of the second expansion coil of the heat exchanger means. The bypass means may comprise a line or hose which is capable of conveying the cooling solution. The bypass line is disposed between the outlet of the cooling unit and the inlet of the heat exchanger. A bypass line is shown at 148 in FIG. 2 and is disposed between outlet 137 of the cooling unit and inlet 131 of the heat exchanger, and joins connecting line 142 right before inlet 144 of the pump.

The secondary loop cooling system of the present invention also includes first valve means disposed in the bypass line between the outlet of the cooling unit means and the inlet of the heat exchanger means. The first valve means may comprise any type of valve which is actuated by a change in temperature, as will be explained below. A first valve 149 is shown in FIG. 2 and is disposed in bypass line 148 between outlet 137 of the cooling unit and inlet 131 of the heat exchanger, before bypass line 148 joins inlet 144 of the pump. The first valve opens to allow the cooling solution to flow directly from the outlet of the cooling unit to the inlet of the heat exchanger, thereby bypassing the reservoir.

The secondary loop cooling system of the present invention further includes second valve means disposed between the outlet of the cooling unit means and the inlet of the reservoir means. The second valve means may comprise any type of valve which is actuated by a change in temperature, as will be explained below. A second valve 150 is shown in FIG. 2 and is disposed between outlet 137 of the cooling unit and inlet 140 of the reservoir in a connecting line 139. The second valve opens when the first valve closes to allow the cooling solution to flow into the inlet of the reservoir.

The secondary loop cooling system of the present invention further includes temperature sensor means adapted to be disposed in the body to be cooled for sensing the temperature in the body, and comparing the temperature in the body to a predetermined temperature. The temperature sensor means may comprise a temperature sensor, such as a temperature sensor 152 as shown in FIG. 2, which is disposed near or in the body to be cooled, such as in the passenger compartment of the automobile. The temperature sensor senses the temperature in the body to be cooled, such as the passenger compartment of an automobile, and compares the temperature in the passenger compartment to a set point, or predetermined temperature. This set point temperature is determined in accordance with how quickly the desired temperature in the body to be cooled can be reached.

The secondary loop cooling system of the present invention further includes means for communicating the temperature in the passenger compartment to the first valve and for opening the first valve when the temperature in the passenger compartment is greater than the predetermined temperature. The means for communicating the temperature in the passenger compartment to the first valve is a line, such as line 153 as shown in FIG. 2. This line can be an electrically conducting wire which sends electrical signals to the first valve.

The secondary loop cooling system of the present invention further includes means for communicating the temperature in the passenger compartment to the second valve means for closing the second valve when the temperature in the passenger compartment is greater than the predetermined temperature. The means for communicating the temperature in the passenger compartment to the second valve means is a line, such as line 154 as shown in FIG. 2. Again, line 154 may be an electrically conducting wire which sends electrical signals to the second valve. Each of the first and the second valves independently communicate with the temperature sensor, which controls their opening and closing.

The first and second valves of the present invention may be electronic solenoid valves and sensor 152 may be a thermostat that provides control signals to each of the valves. The solenoid valves can also be combined into a single two-way solenoid valve that allows flow into either to the reservoir 138 or through line 148. Those trained in the art of control systems will recognize that proportional control can be implemented by applying a duty cycle to the percentage of time flow is permitted through either line 139 or line 148.

In the system of FIG. 2, pump 143 draws fluid from the point that provides the highest pressure feed, which can be from either point 141 or point 149. If valve 150 is closed and 149 is open, flow will still continue from 141 until its pressure equals that of 149. If the pressure in the system at 149 is higher than the pressure in the system at 141, flow will be backwards into the reservoir 138. To prevent this, a check-valve 147 is provided in connecting line 142 that actuates at the same time as valve 150.

The secondary cooling loop as described above may be used in connection with a standard vapor compression system, shown generally at 120 in FIG. 2. Such a vapor compression system includes a compressor 111 having an inlet 112 and an outlet 113, and an accumulator 114 having an inlet 115 and an outlet 116. As shown in FIG. 2, a connecting line 117 connects the accumulator and the compressor. A gaseous refrigerant flows from outlet 116 of an optional accumulator 112, through connecting line 117 to inlet 112 of compressor 111, where the gaseous refrigerant is compressed to a higher pressure. Outlet 113 of the compressor is connected by a connecting line 118 to a condenser 119, which has an inlet 120 and an outlet 121. The compressed gaseous refrigerant is circulated from line 118 to inlet 120 and through the condenser, thus giving off heat, and is converted to a liquid. The liquid refrigerant is circulated to outlet 121 of the condenser and through a valve 122 in a connecting line 123 which connects the condenser to a chiller, or heat exchanger, 125, which is part of the cooling system 120. Heat exchanger 125, as described above, includes first expansion coil 126 having inlet 127 and outlet 128. The refrigerant is circulated from inlet 127 through expansion coil 126 and through outlet 128. Heat exchanger 125 also includes a second expansion coil 129 having inlet 131 and outlet 132, for circulating a cooling solution therethrough to a cooling coil in the body to be cooled, such as the passenger compartment, as described above. The liquid refrigerant evaporates in the heat exchanger at a low temperature to form a low pressure gas and thus produces cooling of the cooling solution. Outlet 128 of the first expansion coil of the heat exchanger is connected by a connecting line 134 to inlet 115 of the accumulator. The low-pressure refrigerant gas from the heat exchanger enters the compressor where the gas is compressed to raise its pressure and temperature, and the cycle then repeats.

In one embodiment, the cooling unit means may comprise a single evaporator, as shown in FIG. 2. However, there may be instances where a dual evaporator may be preferred, such as when cooling large vehicles. Such a dual evaporator system is similar to that shown in FIG. 2, with like elements designated with similar reference numerals, except that in FIG. 3, such like elements are designated by a 200-series reference numeral.

Figure 3:
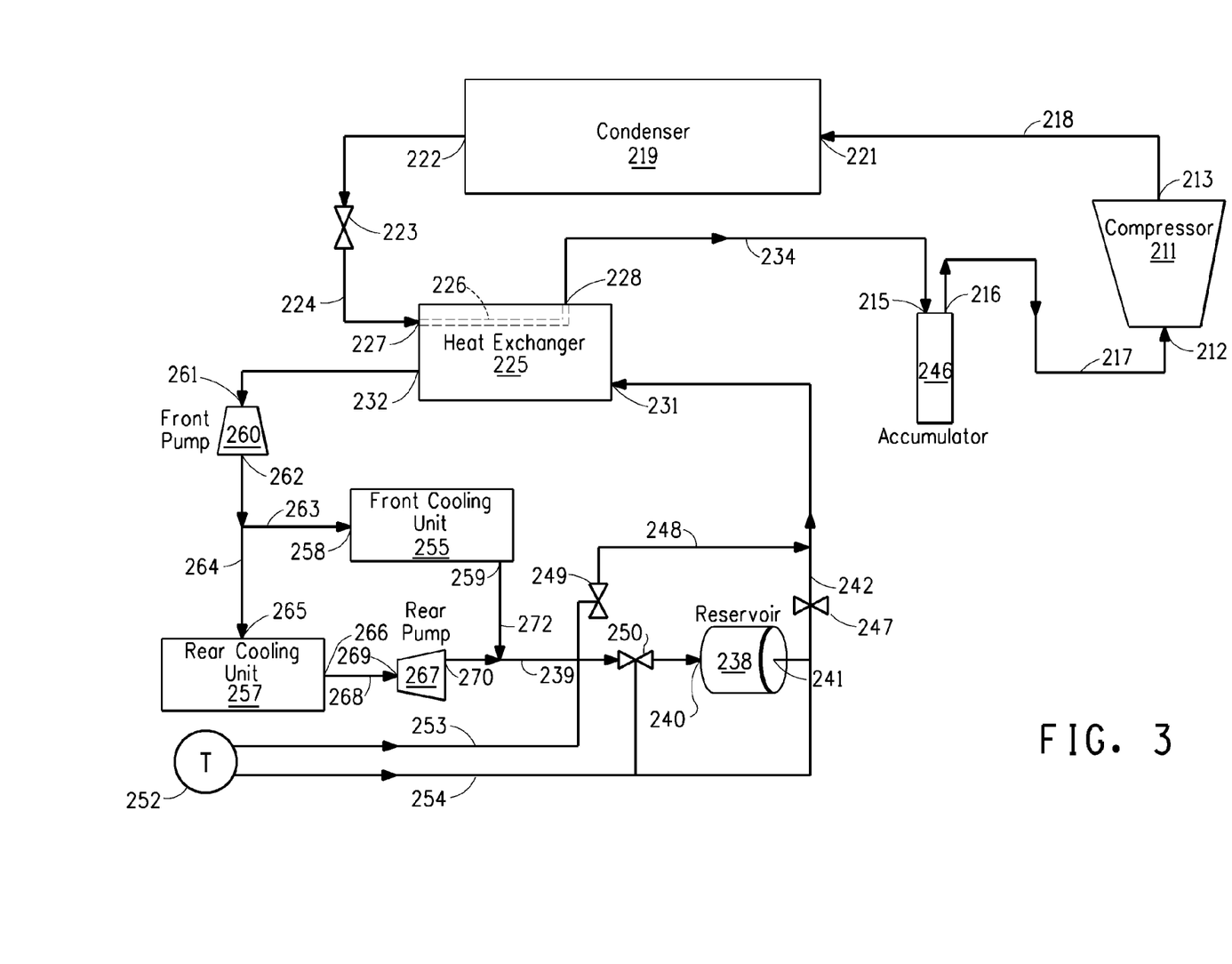
FIG. 3 is a schematic diagram of a secondary loop system for use in an air conditioning system in an automobile in accordance with the present invention which uses a dual evaporator.

The dual evaporator system of FIG. 3 includes two cooling units, specifically, a front cooling unit, shown at 255 in FIG. 3, and a rear cooling unit, shown at 257 in FIG. 3. The front cooling unit has an inlet 258 and an outlet 259. The inlet of the front cooling unit is disposed in fluid communication with a front pump 260. Specifically, the front pump has an inlet 261 and an outlet 262, and the front cooling unit is disposed in fluid communication with the outlet of the front pump via a connecting line 263. The outlet of the front pump is also disposed in fluid communication with the rear cooling unit via a connecting line 264. Specifically, the rear cooling unit has an inlet 265 and an outlet 266, and outlet 262 of the front pump is disposed in fluid communication with inlet 265 of the rear cooling unit. Total loop flow is controlled by the pumping rate of front pump 260. The ratio of flow through the front cooling unit 255 and the rear cooling unit 257 is controlled by the rear pump 267. An alternative design would place proportioning solenoid valves in lines 263 and 264 to control the proportion the total flow of fluid going to each unit. The outlet of the rear cooling unit is disposed in fluid communication with a rear pump 267 via a connecting line 268. The rear pump has an inlet 269 and an outlet 270. The outlet 270 of the rear pump is disposed in fluid communication via a connecting line 239 to a bypass line 248. The outlet of the front cooling unit is also disposed in fluid communication with bypass line 248 via a connecting line 272 and connecting line 239.

The secondary loop cooling system of the dual evaporator embodiment of the present invention as illustrated in FIG. 3 also includes reservoir means for storing the cooling solution. The reservoir means may comprise a reservoir, or tank, such as a reservoir 238 as shown in FIG. 3. Reservoir 238 has an inlet 240 and an outlet 241. A connecting line 239 is disposed between the outlet of the cooling unit and the inlet of the reservoir. The inlet of the reservoir is disposed in fluid communication with outlet 237 of the cooling unit via connecting line 239, so that the cooling fluid flows from the cooling unit to the reservoir.

The secondary loop cooling system of the dual evaporator embodiment of the present invention as illustrated in FIG. 3 also includes a return line for circulating the stored solution from the reservoir back to the heat exchanger. In the embodiment of FIG. 2, this return line is a connecting line 146. Outlet 241 of the reservoir is in fluid communication with inlet 131 of the second expansion coil of the heat exchanger via connecting line 146.

The secondary loop cooling system of the dual evaporator embodiment of the present invention as illustrated in FIG. 3 also includes by-pass means for bypassing the reservoir and delivering the cooling solution directly from the outlet of the cooling unit means to the inlet of the second tube of the heat exchanger. The bypass means may comprise a line or hose which is capable of conveying the cooling solution. A bypass line is shown at 248 in FIG. 3 and is disposed between outlet 237 of the cooling unit and inlet 231 of the second expansion coil of the heat exchanger.

The secondary loop cooling system of the present invention in the embodiment as illustrated in FIG. 3 also includes first valve means disposed in the bypass line between the outlet of the cooling unit means and the inlet of second expansion coil of the heat exchanger means. The first valve means may comprise any type of valve which is actuated by a change in temperature, as will be explained below. A first valve 249 is shown in FIG. 3 and is disposed in bypass line 248 between outlet 237 of the cooling unit and inlet 231 of the second expansion coil of the heat exchanger. The first valve opens to allow the cooling solution to flow directly from the outlet of the cooling unit to the inlet of the second expansion coil of the heat exchanger, thereby bypassing the reservoir.

The secondary loop cooling system of the present invention further includes second valve means disposed between the outlet of the cooling unit means and the inlet of the reservoir means. The second valve means may comprise any type of valve which is actuated by a change in temperature, as will be explained below. A second valve 250 is shown in FIG. 3 and is disposed between outlet 237 of the cooling unit and inlet 240 of the reservoir in connecting line 239. The second valve opens when the first valve closes to allow the cooling solution to flow into the inlet of the reservoir. As noted above with respect to the embodiment of FIG. 2, each of the first and the second valves independently communicate with the temperature sensor, which controls their opening and closing.

The secondary loop cooling system of the embodiment of FIG. 3 of the present invention further includes temperature sensor means adapted to be disposed in the body to be cooled for sensing the temperature in the body, and comparing the temperature in the body to a predetermined temperature. The temperature sensor means may comprise a temperature sensor, such as a temperature sensor 252 as shown in FIG. 3, which is disposed near or in the body to be cooled, such as in the passenger compartment of the automobile. The temperature sensor senses the temperature in the body to be cooled, such as the passenger compartment of an automobile, and compares the temperature in the passenger compartment to a set point, or predetermined temperature. This set point temperature is determined in accordance with how quickly the desired temperature in the body to be cooled can be reached.

The secondary loop cooling system of the embodiment of FIG. 3 of the present invention further includes means for communicating the temperature in the body to be cooled to the first valve and for opening the first valve when the temperature in the body to be cooled is greater than the predetermined temperature. The means for communicating the temperature in the body to be cooled, such as the passenger compartment of an automobile, to the first valve is a line, such as line 253 as shown in FIG. 3. This line can be an electrically conducting wire which sends electrical signals to the first valve. Again, as in the embodiment of FIG. 2, each of the first and the second valves independently communicate with the temperature sensor, which controls their opening and closing.

As in the embodiment of FIG. 2, the first and second valves of the present invention may be electronic solenoid valves and sensor 252 may be a thermostat that provides control signals to each of the valves. The solenoid valves can also be combined into a single two-way solenoid valve that allows flow into either to the reservoir 238 or through line 248. Again, proportional control can be implemented by applying a duty cycle to the percentage of time flow is permitted through either line 239 or line 248.

In the system of FIG. 3, if valve 250 is closed and 249 is open, flow will still continue from 241 until its pressure equals that of 249. If the pressure in the system at 249 is higher than the pressure in the system at 241, flow will be backwards into the reservoir 238. To prevent this, a check-valve 247 is provided in connecting line 242 that actuates at the same time as valve 250.

The secondary cooling loop as described above may be used in connection with a standard vapor compression system, shown generally at 220 in FIG. 3. Such a vapor compression system includes a compressor 211 having an inlet 212 and an outlet 213, and an accumulator 214 having an inlet 215 and an outlet 216. As shown in FIG. 3, a connecting line 217 connects the accumulator and the compressor. A gaseous refrigerant flows from outlet 216 of an optional accumulator 212, through connecting line 217 to inlet 212 of compressor 211, where the gaseous refrigerant is compressed to a higher pressure. Outlet 213 of the compressor is connected by a connecting line 218 to a condenser 219, which has an inlet 220 and an outlet 221. The compressed gaseous refrigerant is circulated from line 218 to inlet 220 and through the condenser, thus giving off heat, and is converted to a liquid. The liquid refrigerant is circulated to outlet 221 of the condenser and through a valve 222 in a connecting line 223 which connects the condenser to a chiller, or heat exchanger, 225, which is part of the cooling system 220. Heat exchanger 225 includes a first expansion coil 226 having an inlet 227 and an outlet 228, as described above. The refrigerant is circulated from inlet 227 through tube 226 and through outlet 228. Heat exchanger 225 also includes second expansion coil 229 having inlet 231 and outlet 232, for circulating a cooling solution therethrough to a cooling coil in the body to be cooled, such as the passenger compartment, as described above. The liquid refrigerant evaporates in the heat exchanger at a low temperature to form a low pressure gas and thus produces cooling of the cooling solution. Outlet 228 of the first expansion coil of the heat exchanger is connected by a connecting line 234 to inlet 215 of the accumulator. The low-pressure refrigerant gas from the heat exchanger enters the compressor where the gas is compressed to raise its pressure and temperature, and the cycle then repeats.

Further in accordance with the present invention, there is provided a method for bypassing a reservoir in a secondary cooling loop system for use with a vapor compression system in an air conditioning system of an automobile. This method will be described in conjunction with a description of the operation of the systems as described above in FIGS. 2 and 3. The method comprises the step of circulating a refrigerant through a first expansion coil of a heat exchanger. A refrigerant is circulated through an inlet, such as 127 or 227, of a first expansion coil, such as 126 or 226, respectively, of FIGS. 2 and 3, of a heat exchanger, such as 125 or 225, to an outlet thereof, such as 128 or 228.

The method of the present invention also includes the step of circulating a cooling solution through a second expansion coil of the heat exchanger. A cooling solution is circulated through an inlet, such as 131 or 231 of a second tube, such as 129 or 229, respectively, of FIGS. 2 and 3, of a heat exchanger, such as 125 or 225, respectively, to an outlet thereof, such as outlet 132 or 232, of FIGS. 2 and 3. The heat exchanger may be a counter-current heat exchanger, where refrigerant is circulated in the first expansion coil in one direction and the cooling solution is circulated through the second expansion in the opposite direction, and heat exchange is effected between the refrigerant and the solution.

The method of the present invention also includes the step of circulating the cooling solution to a cooling unit, which is adapted to be located in the body to be cooled. In the embodiment of FIG. 2, the cooling solution is circulated to a cooling unit, such as cooling unit 133, which is adapted to be located in the body to be cooled, such as the passenger compartment of an automobile. In the dual evaporator system of FIG. 3 the cooling solution is circulated through two cooling units, specifically, a front cooling unit, shown at 255 in FIG. 3, and a rear cooling unit, shown at 257 in FIG. 3. Cooling solution flows from a front pump, such as pump 260, to an inlet 258 to an outlet 259 of the cooling unit. Specifically, the front pump has an inlet 261 and an outlet 262, so that the cooling solution flows from the outlet of the front pump to the inlet of the inlet of the cooling unit via a connecting line. Cooling solution also flows from the outlet of the front pump to an inlet 265 of a rear cooling unit via a connecting line 264, through the cooling unit and to outlet 262 of the cooling unit. The cooling solution flows from the outlet of the rear cooling unit via a connecting line, such as line 268, to a rear pump, such as pump 267. The cooling solution flows from the outlet of the rear pump via a connecting line, such as line 239, to a bypass line, such as line 248. The outlet of the front cooling unit is also disposed in fluid communication with bypass line 248 via a connecting line 272 and connecting line 239, so that the cooling solution also flows to the bypass line from the front cooling unit. Total loop flow is controlled by the pumping rate of front pump 260. The ratio of flow through the front cooling unit 255 and the rear cooling unit 257 is controlled by the rear pump 267.

The method of the present invention also includes the step of opening a first valve disposed in a connecting line disposed between the outlet of the cooling unit and the inlet of the second expansion coil of the heat exchanger. A first valve, such as 149 or 249, disposed in a bypass line, such as bypass line 148 or 248, between outlet 137 or 237 of the cooling unit and inlet 231 of the second expansion coil of heat exchanger 225.

The method of the present invention also includes the step of closing a second valve disposed in a connecting line between the outlet of the cooling unit and the inlet of a reservoir to deliver the solution directly from the outlet of the cooling unit to the inlet of the second expansion coil of the heat exchanger. A second valve, such as 150 or 250, disposed in a connecting line such as 139 or 239 is disposed between the outlet of the cooling unit, such as 137 or 237 and the inlet, such as 140 or 240, of a reservoir, 138 or 238. The first valve opens to deliver the solution directly from the outlet of the cooling unit to the inlet of the second expansion coil of the heat exchanger, thereby bypassing the reservoir.

The method of the present invention also includes the step of circulating the solution from the by-pass line back to the inlet of the second expansion coil of the heat exchanger. In this step, the cooling solution is pumped by a pump, such as pump 143 or 243 from a by-pass line, such as 141' or 241, back to the inlet 131 or 231 of the second expansion coil of the heat exchanger, such as 124 or 224.

The method of the present invention further includes the step of sensing the temperature of the air in the body to be cooled and comparing the temperature in the body to be cooled to a predetermined temperature, and opening the first valve when the temperature in the passenger compartment is greater than the predetermined temperature. In this step, the temperature of the air in the body to be cooled, such as a passenger compartment of an automobile is sensed by a temperature sensor, such as sensor 152 in FIG. 2 or 252 in FIG. 3. The first valve, such as 149 or 249, is opened when the temperature in the body to be cooled is greater than the predetermined temperature.

The method of the present invention further includes the step of closing the first valve and opening a second valve when the temperature in the passenger compartment is less than a predetermined temperature. In this step, the first valve, such as valve 149 or 249 in FIGS. 2 and 3, respectively, is opened, and second valve, such as 150 in FIG. 2 or 250 in FIG. 3 is closed, when the temperature in the passenger compartment is less than a predetermined temperature. This lower temperature signals a drop in temperature in the passenger compartment, at which point, the bypass is no longer needed. At this point, when the body to be cooled, such as the passenger compartment of the automobile, is at the desired temperature, the cooling solution can flow through the reservoir, and the entire contents of the reservoir can flow through the secondary loop cooling system.

The cooling solution used in the system and the method is preferably a non-flammable cooling solution. In addition, when a flammable refrigerant is used, such as 152 a, this lessens the flammability of the system. The cooling solution may be either ethylene glycol or propylene glycol, or it may be propane diol, or mixtures of any of the foregoing in this sentence with water. In one embodiment, a 30% ethylene glycol, 70% water solution may be used.

The refrigerant used in the system or the method of the present invention may comprise at least one fluoroolefin. The fluoroolefins used with the present invention may be from one of the following groups:

(i) fluoroolefins of the formula E— or Z—$R^1CH=CHR^2$, wherein $R^1$ and $R^2$ are, independently, $C_1$ to $C_6$ perfluoroalkyl groups; (ii) cyclic fluoroolefins of the formula cyclo-[CX=CY(CZW)$_n$—], wherein X, Y, Z, and W, independently, are H or F, and n is an integer from 2 to 5; or (iii) fluoroolefins selected from the group consisting of: tetrafluoroethylene ($CF_2=CF_2$); hexafluoropropene ($CF_3CF=CF_2$); 1,2,3,3,3-pentafluoro-1-propene (CHF=$CFCF_3$), 1,1,3,3,3-pentafluoro-1-propene ($CF_2=CHCF_3$), 1,1,2,3,3-pentafluoro-1-propene ($CF_2=CFCHF_2$), 1,2,3,3-tetrafluoro-1-propene (CHF=$CFCHF_2$), 2,3,3,3-tetrafluoro-1-propene ($CH_2=CFCF_3$), 1,3,3,3-tetrafluoro-1-propeneCHF=$CHCF_3$), 1,1,2,3-tetrafluoro-1-propene ($CF_2=CFCH_2F$), 1,1,3,3-tetrafluoro-1-propene ($CF_2=CHCHF_2$), 1,2,3,3-tetrafluoro-1-propene (CHF=$CFCHF_2$), 3,3,3-trifluoro-1-propene ($CH_2=CHCF_3$), 2,3,3-trifluoro-1-propene ($CHF_2CF=CH_2$); 1,1,2-trifluoro-1-propene ($CH_3CF=CF_2$); 1,2,3-trifluoro-1-propene ($CH_2FCF=CF_2$); 1,1,3-trifluoro-1-propene ($CH_2FCH=CF_2$); 1,3,3-trifluoro-1-propene ($CHF_2CH=CHF$); 1,1,1,2,3,4,4,4-octafluoro-2-butene ($CF_3CF=CFCF_3$); 1,1,2,3,3,4,4,4-octafluoro-1-butene ($CF_3CF_2CF=CF_2$); 1,1,1,2,4,4,4-heptafluoro-2-butene ($CF_3CF=CHCF_3$); 1,2,3,3,4,4,4-heptafluoro-1-butene (CHF=$CFCF_2CF_3$); 1,1,1,2,3,4,4-heptafluoro-2-butene ($CHF_2CF=CFCF_3$); 1,3,3,3-tetrafluoro-2-(trifluoromethyl)-1-propene (($CF_3)_2C=CHF$); 1,1,3,3,4,4,4-heptafluoro-1-butene ($CF_2=CHCF_2CF_3$); 1,1,2,3,4,4,4-heptafluoro-1-butene (CF$_2$=CFCHFCF$_3$); 1,1,2,3,3,4,4-heptafluoro-1-butene (CF$_2$=CFCF$_2$CHF$_2$); 2,3,3,4,4,4-hexafluoro-1-butene (CF$_3$CF$_2$CF=CH$_2$); 1,3,3,4,4,4-hexafluoro-1-butene (CHF=CHCF$_2$CF$_3$); 1,2,3,4,4,4-hexafluoro-1-butene (CHF=CFCHFCF$_3$); 1,2,3,3,4,4-hexafluoro-1-butene (CHF=CFCF$_2$CHF$_2$); 1,1,2,3,4,4-hexafluoro-2-butene (CHF$_2$CF=CFCHF$_2$); 1,1,1,2,3,4-hexafluoro-2-butene (CH$_2$FCF=CFCF$_3$); 1,1,1,2,4,4-hexafluoro-2-butene (CHF$_2$CH=CFCF$_3$); 1,1,1,3,4,4-hexafluoro-2-butene (CF$_3$CH=CFCHF$_2$); 1,1,2,3,3,4-hexafluoro-1-butene (CF$_2$=CFCF$_2$CH$_2$F); 1,1,2,3,3,4-hexafluoro-1-butene (CF$_2$=CFCHFCHF$_2$); 3,3,3-trifluoro-2-(trifluoromethyl)-1-propene (CH$_2$=C(CF$_3$)$_2$); 1,1,1,2,4-pentafluoro-2-butene (CH$_2$FCH=CFCF$_3$); 1,1,1,3,4-pentafluoro-2-butene (CF$_3$CH=CFCH$_2$F); 3,3,4,4,4-pentafluoro-1-butene (CF$_3$CF$_2$CH=CH$_2$); 1,1,1,4,4-pentafluoro-2-butene (CHF$_2$CH=CHCF$_3$); 1,1,1,2,3-pentafluoro-2-butene (CH$_3$CF=CFCF$_3$); 2,3,3,4,4-pentafluoro-1-butene (CH$_2$=CFCF$_2$CHF$_2$); 1,1,2,4,4-pentafluoro-2-butene (CHF$_2$CF=CHCHF$_2$); 1,1,2,3,3-pentafluoro-1-butene (CH$_3$CF$_2$CF=CF$_2$); 1,1,2,3,4-pentafluoro-2-butene (CH$_2$FCF=CFCHF$_2$); 1,1,3,3,3-pentafluoro-2-methyl-1-propene (CF$_2$=C(CF$_3$)(CH$_3$)); 2-(difluoromethyl)-3,3,3-trifluoro-1-propene (CH$_2$=C(CHF$_2$)(CF$_3$)); 2,3,4,4,4-pentafluoro-1-butene (CH$_2$=CFCHFCF$_3$); 1,2,4,4,4-pentafluoro-1-butene (CHF=CFCH$_2$CF$_3$); 1,3,4,4,4-pentafluoro-1-butene (CHF=CHCHFCF$_3$); 1,3,4,4,4-pentafluoro-1-butene (CHF=CHCF$_2$CHF$_2$); 1,2,4,4,4-pentafluoro-1-butene (CHF=CFCHFCHF$_2$); 3,3,4,4-tetrafluoro-1-butene (CH$_2$=CHCF$_2$CHF$_2$); 1,1-difluoro-2-(difluoromethyl)-1-propene (CF$_2$=C(CHF$_2$)(CH$_3$)); 1,3,3,3-tetrafluoro-2-methyl-1-propene (CHF=C(CF$_3$)(CH$_3$)); 3,3-difluoro-2-(difluoromethyl)-1-propene (CH$_2$=C(CHF$_2$)$_2$); 1,1,1,2-tetrafluoro-2-butene (CF$_3$CF=CHCH$_3$); 1,1,1,3-tetrafluoro-2-butene (CH$_3$CF=CHCF$_3$); 1,1,1,2,3,4,4,5,5,5-decafluoro-2-pentene (CF$_3$CF=CFCF$_2$CF$_3$); 1,1,2,3,3,4,4,5,5,5-decafluoro-1-pentene (CF$_2$=CFCF$_2$CF$_2$CF$_3$); 1,1,1,4,4,4-hexafluoro-2-(trifluoromethyl)-2-butene ((CF$_3$)$_2$C=CHCF$_3$); 1,1,1,2,4,4,5,5,5-nonafluoro-2-pentene (CF$_3$CF=CHCF$_2$CF$_3$); 1,1,1,3,4,4,5,5,5-nonafluoro-2-pentene (CF$_3$CH=CFCF$_2$CF$_3$); 1,2,3,3,4,4,5,5,5-nonafluoro-1-pentene (CHF=CFCF$_2$CF$_2$CF$_3$); 1,1,3,3,4,4,5,5,5-nonafluoro-1-pentene (CF$_2$=CHCF$_2$CF$_2$CF$_3$); 1,1,2,3,4,4,5,5,5-nonafluoro-1-pentene (CF$_2$=CFCF$_2$CF$_2$CHF$_2$); 1,1,2,3,4,4,5,5,5-nonafluoro-2-pentene (CHF$_2$CF=CFCF$_2$CF$_3$); 1,1,1,2,3,4,4,5,5-nonafluoro-2-pentene (CF$_3$CF=CFCF$_2$CHF$_2$); 1,1,1,2,3,4,5,5,5-nonafluoro-2-pentene (CF$_3$CF=CFCHFCF$_3$); 1,2,3,4,4,4-hexafluoro-3-(trifluoromethyl)-1-butene (CHF=CFCF(CF$_3$)$_2$); 1,1,2,4,4,4-hexafluoro-3-(trifluoromethyl)-1-butene (CF$_2$=CFCH(CF$_3$)$_2$); 1,1,1,4,4,4-hexafluoro-2-(trifluoromethyl)-2-butene (CF$_3$CH=C(CF$_3$)$_2$); 1,1,3,4,4,4-hexafluoro-3-(trifluoromethyl)-1-butene (CF$_2$=CHCH(CF$_3$)$_2$); 2,3,3,4,4,5,5,5-octafluoro-1-pentene (CH$_2$=CFCF$_2$CF$_2$CF$_3$); 1,2,3,3,4,4,5,5-octafluoro-1-pentene (CHF=CFCF$_2$CF$_2$CHF$_2$); 3,3,4,4,4-pentafluoro-2-(trifluoromethyl)-1-butene (CH$_2$=C(CF$_3$)CF$_2$CF$_3$); 1,1,4,4,4-pentafluoro-3-(trifluoromethyl)-1-butene (CF$_2$=CHCH(CF$_3$)$_2$); 1,3,4,4,4-pentafluoro-3-(trifluoromethyl)-1-butene (CHF=CHCF(CF$_3$)$_2$); 1,1,4,4,4-pentafluoro-2-(trifluoromethyl)-1-butene (CF$_2$=C(CF$_3$)CH$_2$CF$_3$); 3,4,4,4-tetrafluoro-3-(trifluoromethyl)-1-butene ((CF$_3$)$_2$CFCH=CH$_2$); 3,3,4,4,5,5,5-heptafluoro-1-pentene (CF$_3$CF$_2$CF$_2$CH=CH$_2$); 2,3,3,4,4,5,5-heptafluoro-1-pentene (CH$_2$=CFCF$_2$CF$_2$CHF$_2$); 1,1,3,3,5,5,5-heptafluoro-1-butene (CF$_2$=CHCF$_2$CH$_2$CF$_3$); 1,1, 1,2,4,4,4-heptafluoro-3-methyl-2-butene (CF$_3$CF=C(CF$_3$)(CH$_3$)); 2,4,4,4-tetrafluoro-3-(trifluoromethyl)-1-butene (CH$_2$=CFCH(CF$_3$)$_2$); 1,4,4,4-tetrafluoro-3-(trifluoromethyl)-1-butene (CHF=CHCH(CF$_3$)$_2$); 1,1,1,4-tetrafluoro-2-(trifluoromethyl)-2-butene (CH$_2$FCH=C(CF$_3$)$_2$); 1,1,1,3-tetrafluoro-2-(trifluoromethyl)-2-butene (CH$_3$CF=C(CF$_3$)$_2$); 1,1,1-trifluoro-2-(trifluoromethyl)-2-butene ((CF$_3$)$_2$C=CHCH$_3$); 3,4,4,5,5,5-hexafluoro-2-pentene (CF$_3$CF$_2$CF=CHCH$_3$); 1,1,1,4,4,4-hexafluoro-2-methyl-2-butene (CF$_3$C(CH$_3$)=CHCF$_3$); 3,3,4,5,5,5-hexafluoro-1-pentene (CH$_2$=CHCF$_2$CHFCF$_3$); 4,4,4-trifluoro-2-(trifluoromethyl)-1-butene (CH$_2$=C(CF$_3$)CH$_2$CF$_3$); 1,1,2,3,3,4,4,5,5,6,6,6-dodecafluoro-1-hexene (CF$_3$(CF$_2$)$_3$CF=CF$_2$); 1,1,1,2,2,3,4,5,5,6,6,6-dodecafluoro-3-hexene (CF$_3$CF$_2$CF=CFCF$_2$CF$_3$); 1,1,1,4,4,4-hexafluoro-2,3-bis(trifluoromethyl)-2-butene ((CF$_3$)$_2$C=C(CF$_3$)$_2$); 1,1,1,2,3,4,5,5,5-nonafluoro-4-(trifluoromethyl)-2-pentene ((CF$_3$)$_2$CFCF=CFCF$_3$); 1,1,1,4,4,5,5,5-octafluoro-2-(trifluoromethyl)-2-pentene ((CF$_3$)$_2$C=CHC$_2$F$_5$); 1,1,1,3,4,5,5,5-octafluoro-4-(trifluoromethyl)-2-pentene ((CF$_3$)$_2$CFCF=CHCF$_3$); 3,3,4,4,5,5,6,6,6-nonafluoro-1-hexene (CF$_3$CF$_2$CF$_2$CF$_2$CH=CH$_2$); 4,4,4-trifluoro-3,3-bis(trifluoromethyl)-1-butene (CH$_2$=CHC(CF$_3$)$_3$); 1,1,1,4,4,4-hexafluoro-3-methyl-2-(trifluoromethyl)-2-butene ((CF$_3$)$_2$C=C(CH$_3$)(CF$_3$)); 2,3,3,5,5,5-hexafluoro-4-(trifluoromethyl)-1-pentene (CH$_2$=CFCF$_2$CH(CF$_3$)$_2$); 1,1,1,2,4,4,5,5,5-nonafluoro-3-methyl-2-pentene (CF$_3$CF=C(CH$_3$)CF$_2$CF$_3$); 1,1,1,5,5,5-hexafluoro-4-(trifluoromethyl)-2-pentene (CF$_3$CH=CHCH(CF$_3$)$_2$); 3,4,4,5,5,6,6,6-octafluoro-2-hexene (CF$_3$CF$_2$CF$_2$CF=CHCH$_3$); 3,3,4,4,5,5,6,6-octafluoro1-hexene (CH$_2$=CHCF$_2$CF$_2$CF$_2$CHF$_2$); 1,1,1,4,4-pentafluoro-2-(trifluoromethyl)-2-pentene ((CF$_3$)$_2$C=CHCF$_2$CH$_3$); 4,4,5,5,5-pentafluoro-2-(trifluoromethyl)-1-pentene (CH$_2$=C(CF$_3$)CH$_2$C$_2$F$_5$); 3,3,4,4,5,5,5-heptafluoro-2-methyl-1-pentene (CF$_3$CF$_2$CF$_2$C(CH$_3$)=CH$_2$); 4,4,5,5,6,6,6-heptafluoro-2-hexene (CF$_3$CF$_2$CF$_2$CH=CHCH$_3$); 4,4,5,5,6,6,6-heptafluoro-1-hexene (CH$_2$=CHCH$_2$CF$_2$C$_2$F$_5$); 1,1,1,2,2,3,4-heptafluoro-3-hexene (CF$_3$CF$_2$CF=CFC$_2$H$_5$); 4,5,5,5-tetrafluoro-4-(trifluoromethyl)-1-pentene (CH$_2$=CHCH$_2$CF(CF$_3$)$_2$); 1,1,1,2,5,5,5-heptafluoro-4-methyl-2-pentene (CF$_3$CF=CHCH(CF$_3$)(CH$_3$)); 1,1,1,3-tetrafluoro-2-(trifluoromethyl)-2-pentene ((CF$_3$)$_2$C=CFC$_2$H$_5$); 1,1,1,2,3,4,4,5,5,6,6,7,7,7-tetradecafluoro-2-heptene (CF$_3$CF=CFCF$_2$CF$_2$C$_2$F$_5$); 1,1,1,2,2,3,4,5,5,6,6,7,7,7-tetradecafluoro-3-heptene (CF$_3$CF$_2$CF=CFCF$_2$C$_2$F$_5$); 1,1,1,3,4,4,5,5,6,6,7,7,7-tridecafluoro-2-heptene (CF$_3$CH=CFCF$_2$CF$_2$C$_2$F$_5$); 1,1,1,2,4,4,5,5,6,6,7,7,7-tridecafluoro-2-heptene (CF$_3$CF=CHCF$_2$CF$_2$C$_2$F$_5$); 1,1,1,2,2,4,5,5,6,6,7,7,7-tridecafluoro-3-heptene (CF$_3$CF$_2$CH=CFCF$_2$C$_2$F$_5$); and 1,1,1,2,2,3,5,5,6,6,7,7,7-tridecafluoro-3-heptene (CF$_3$CF$_2$CF=CHCF$_2$C$_2$F$_5$), or mixtures thereof, meaning mixtures of any of the foregoing fluoroolefins listed in this paragraph. Compounds comprising fluoroolefins which are suitable for use with the present invention are disclosed in U.S. patent application Ser. No. 11/369,227 filed Mar. 2, 2006, U.S. patent application Ser. No. 11/393,109 filed Mar. 30, 2006, and U.S. patent application Ser. No. 11/486,791 filed Jul. 13, 2006.

Alternatively, the refrigerants used in the system or the method of the present invention may be hydrofluorocarbons, hydrocarbons, dimethyl ether, CF$_3$I, ammonia, carbon dioxide (CO$_2$) and mixtures thereof, meaning mixtures of any of the additional compounds listed in this paragraph, with each other, or with fluoroolefins as described above.

In one embodiment, the refrigerant may be a hydrofluorocarbon (HFC). HFC compounds of the present invention comprise saturated compounds containing carbon, hydrogen, and fluorine. Of particular utility are hydrofluorocarbons having 1-7 carbon atoms and having a normal boiling point of from about −90° C. to about 80° C. Hydrofluorocarbons are commercial products available from a number of sources such as E. I. du Pont de Nemours and Company, Fluoroproducts, Wilmington, Del., 19898, USA, or may be prepared by methods known in the art. Representative hydrofluorocarbon compounds include but are not limited to fluoromethane ($CH_3F$, HFC-41), difluoromethane ($CH_2F_2$, HFC-32), trifluoromethane ($CHF_3$, HFC-23), pentafluoroethane ($CF_3CHF_2$, HFC-125), 1,1,2,2-tetrafluoroethane ($CHF_2CHF_2$, HFC-134), 1,1,1,2-tetrafluoroethane ($CF_3CH_2F$, HFC-134a), 1,1,1-trifluoroethane ($CF_3CH_3$, HFC-143a), 1,1-difluoroethane ($CHF_2CH_3$, HFC-152a), fluoroethane ($CH_3CH_2F$, HFC-161), 1,1,1,2,2,3,3-heptafluoropropane ($CF_3CF_2CHF_2$, HFC-227ca), 1,1,1,2,3,3,3-heptafluoropropane ($CF_3CHFCF_3$, HFC-227ea), 1,1,2,2,3,3,-hexafluoropropane ($CHF_2CF_2CHF_2$, HFC-236ca), 1,1,1,2,2,3-hexafluoropropane ($CF_3CF_3CH_2F$, HFC-236cb), 1,1,1,2,3,3-hexafluoropropane ($CF_3CHFCHF_2$, HFC-236ea), 1,1,1,3,3,3-hexafluoropropane ($CF_3CH_2CF_3$, HFC-236fa), 1,1,2,2,3-pentafluoropropane ($CHF_2CF_2CH_2F$, HFC-245ca), 1,1,1,2,2-pentafluoropropane ($CF_3CF_2CH_3$, HFC-245cb), 1,1,2,3,3-pentafluoropropane ($CHF_2CHFCHF_2$, HFC-245ea), 1,1,1,2,3-pentafluoropropane ($CF_3CHFCH_2F$, HFC-245eb), 1,1,1,3,3-pentafluoropropane ($CF_3CH_2CHF_2$, HFC-245fa), 1,2,2,3-tetrafluoropropane ($CH_2FCF_2CH_2F$, HFC-254ca), 1,1,2,2-tetrafluoropropane ($CHF_2CF_2CH_3$, HFC-254cb), 1,1,2,3-tetrafluoropropane ($CHF_2CHFCH_2F$, HFC-254ea), 1,1,1,2-tetrafluoropropane ($CF_3CHFCH_3$, HFC-254eb), 1,1,3,3-tetrafluoropropane ($CHF_2CH_2CHF_2$, HFC-254fa), 1,1,1,3-tetrafluoropropane ($CF_3CH_2CH_2F$, HFC-254fb), 1,1,1-trifluoropropane ($CF_3CH_2CH_3$, HFC-263fb), 2,2-difluoropropane ($CH_3CF_2CH_3$, HFC-272ca), 1,2-difluoropropane ($CH_2FCHFCH_3$, HFC-272ea), 1,3-difluoropropane ($CH_2FCH_2CH_2F$, HFC-272fa), 1,1-difluoropropane ($CHF_2CH_2CH_3$, HFC-272fb), 2-fluoropropane ($CH_3CHFCH_3$, HFC-281ea), 1-fluoropropane ($CH_2FCH_2CH_3$, HFC-281fa), 1,1,2,2,3,3,4,4-octafluorobutane ($CHF_2CF_2CF_2CHF_2$, HFC-338pcc), 1,1,1,2,2,4,4,4-octafluorobutane ($CF_3CH_2CF_2CF_3$, HFC-338mf), 1,1,1,3,3-pentafluorobutane ($CF_3CH_2CHF_2$, HFC-365mfc), 1,1,1,2,3,4,4,5,5,5-decafluoropentane ($CF_3CHFCHFCF_2CF_3$, HFC-43-10mee), 1,1,1,2,2,3,4,5,5,6,6,7,7,7-tetradecafluoroheptane ($CF_3CF_2CHFCHFCF_2CF_2CF_3$, HFC-63-14mee), and mixtures thereof, meaning mixtures of any of the hydrofluorocarbons listed in this paragraph.

In another embodiment, the refrigerants may comprise at least one hydrocarbon. The hydrocarbons of the present invention comprise compounds having only carbon and hydrogen. Of particular utility are compounds having from about 3 to about 7 carbon atoms. Hydrocarbons are commercially available through numerous chemical suppliers. Representative hydrocarbons include but are not limited to propane, n-butane, isobutane, cyclobutane, n-pentane, 2-methylbutane, 2,2-dimethylpropane, cyclopentane, n-hexane, 2-methylpentane, 2,2-dimethylbutane, 2,3-dimethylbutane, 3-methylpentane, cyclohexane, n-heptane, cycloheptane, and mixtures thereof, meaning mixtures of any of the hydrocarbons listed in this paragraph.

In another embodiment, the refrigerants used with the system and the method of the present invention may comprise a hydrocarbon containing heteroatoms, such as dimethylether (DME, $CH_3OCH_3$. DME is commercially available.

In another embodiment, the refrigerants used with the system and the method of the present invention may comprise ammonia ($NH_3$), which is commercially available from various sources or may be prepared by methods known in the art.

In another embodiment, the refrigerants used with the system and the method of the present invention may comprise carbon dioxide ($CO_2$), which is commercially available from various sources or may be prepared by methods known in the art.

The refrigerants used with the system and the method of the present invention may further comprise at least one lubricant selected from the group consisting of mineral oils, alkylbenzenes, poly-alpha-olefins, silicone oils, polyoxyalkylene glycol ethers, polyol esters, polyvinylethers, and mixtures thereof. Lubricants of the present invention comprise those suitable for use with refrigeration or air-conditioning apparatus. Among these lubricants are those conventionally used in compression refrigeration apparatus utilizing chlorofluorocarbon refrigerants. Such lubricants and their properties are discussed in the 1990 ASHRAE Handbook, Refrigeration Systems and Applications, chapter 8, titled "Lubricants in Refrigeration Systems", pages 8.1 through 8.21, herein incorporated by reference. Lubricants of the present invention may comprise those commonly known as "mineral oils" in the field of compression refrigeration lubrication. Mineral oils comprise paraffins (i.e. straight-chain and branched-carbon-chain, saturated hydrocarbons), naphthenes (i.e. cyclic or ring structure saturated hydrocarbons, which may be paraffins) and aromatics (i.e. unsaturated, cyclic hydrocarbons containing one or more rings characterized by alternating double bonds). Lubricants of the present invention further comprise those commonly known as "synthetic oils" in the field of compression refrigeration lubrication. Synthetic oils comprise alkylaryls (i.e. linear and branched alkyl alkylbenzenes), synthetic paraffins and naphthenes, silicones, and poly-alpha-olefins. Representative conventional lubricants of the present invention are the commercially available BVM 100 N (paraffinic mineral oil sold by BVA Oils), naphthenic mineral oil commercially available under the trademark from Suniso® 3GS and Suniso® 5GS by Crompton Co., naphthenic mineral oil commercially available from Pennzoil under the trademark Sontex® 372LT, naphthenic mineral oil commercially available from Calumet Lubricants under the trademark Calumet® RO-30, linear alkylbenzenes commercially available from Shrieve Chemicals under the trademarks Zerol® 75, Zerol® 150 and Zerol® 500 and branched alkylbenzene, sold by Nippon Oil as HAB 22.

In another embodiment, lubricants of the present invention further comprise those which have been designed for use with hydrofluorocarbon refrigerants and are miscible with refrigerants of the present invention under compression refrigeration and air-conditioning apparatus' operating conditions. Such lubricants and their properties are discussed in "Synthetic Lubricants and High-Performance Fluids", R. L. Shubkin, editor, Marcel Dekker, 1993. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), and polyvinyl ethers (PVEs).

Lubricants of the present invention are selected by considering a given compressor's requirements and the environment to which the lubricant will be exposed.

The refrigerants, either alone or with lubricants, used with the system or the method of the present invention may be prepared by any convenient method to combine the desired amount of the individual components. A preferred method is to weigh the desired component amounts and thereafter combine the components in an appropriate vessel. Agitation may be used, if desired.

What is claimed is:

1. A secondary cooling loop system for use in an air conditioning system of a body to be cooled, comprising:
    (a) a heat exchanger having a first expansion coil for circulating a refrigerant therethrough and a second expansion coil having an inlet and an outlet for circulating a refrigerant therethrough;
    (b) a cooling unit for cooling the solution as it circulates therethrough, the cooling unit having an inlet and an outlet, wherein the inlet is in fluid communication with the second expansion coil of the heat exchanger;
    (c) a reservoir for storing the solution, the reservoir having an inlet and an outlet, wherein the inlet is disposed in fluid communication with outlet of the cooling unit;
    (d) a return line for returning the stored solution from the reservoir back to the inlet of the second expansion coil of the heat exchanger, the return line being disposed in fluid communication with the first outlet of the reservoir and with the inlet of the second expansion coil of the heat exchanger;
    (e) a by-pass line disposed between the outlet of the cooling unit and the second expansion boil of the heat exchanger for bypassing the reservoir and delivering the solution directly from the outlet of the cooling unit to the inlet of the second expansion coil of the heat exchanger;
    (f) a first valve disposed in the bypass line between the outlet of the cooling unit and the inlet of the second expansion coil of the heat exchanger, wherein the first valve opens to deliver the solution directly from the outlet of the cooling unit to the inlet of the second expansion coil of the heat exchanger, thereby bypassing the reservoir; and
    (g) a connecting line disposed between the outlet of the cooling coil and the inlet of the reservoir, and a second valve disposed in the connecting line, wherein the second valve opens when the first valve closes to allow the solution to flow into the inlet of the reservoir.

2. The system of claim 1, further comprising a temperature sensor adapted to be disposed in the body to be cooled for sensing the temperature in the passenger compartment, and comparing the temperature in the body to be cooled to a predetermined temperature, wherein the first valve opens and the second valve closes when the temperature in the body to be cooled greater than the predetermined temperature.

3. The system of claim 2, further including means for communicating the temperature in the body to be cooled to the first valve, and means in the first valve for opening the first valve when the temperature in the body to be cooled passenger compartment is greater than the predetermined temperature.

4. The system of claim 2, further including means for communicating the temperature in the body to be cooled to the second valve, and means in the second valve for closing the second valve when the temperature in the body to be cooled is greater than the predetermined temperature.

5. The system of claim 1, wherein the heat exchanger is a counter-current heat exchanger wherein the refrigerant flows therethrough in one direction in the first expansion coil and the solution flows therethrough in the second expansion coil in the opposite direction.

6. The system of claim 1, wherein the cooling unit comprises a single evaporator cooling unit.

7. The system of claim 1, wherein the cooling unit comprises a dual evaporator cooling unit including:
    (a) a front pump having an inlet and an outlet, wherein the inlet is disposed in fluid communication with the heat exchanger,
    (b) a front cooling unit disposed in fluid communication with the outlet of the front pump,
    (c) a rear cooling unit having an inlet and an outlet, wherein the outlet is disposed in fluid communication with the outlet of the front pump, and
    (d) a rear pump having an inlet and an outlet, wherein the outlet of the rear cooling unit is disposed in fluid communication with the inlet of the rear pump, and the outlet of the rear pump is disposed in fluid communication with the bypass line.

8. A secondary cooling loop system for use in a vapor compression air conditioning system of an automobile, comprising:
    (a) heat exchanger means having a first expansion coil for circulating a refrigerant therethrough and a second expansion coil for circulating a cooling solution therethrough;
    (b) cooling means for cooling the solution as it circulates therethrough, the cooling means having an inlet and an outlet, wherein the inlet is in fluid communication with the second expansion coil of the heat exchanger means;
    (c) reservoir means for storing the solution, the reservoir means having an inlet and an outlet, wherein the inlet is disposed in fluid communication with outlet of the cooling means;
    (d) means for circulating the stored solution from the reservoir back to the heat exchanger means, the circulating means having an inlet disposed in fluid communication with the outlet of the reservoir means and an outlet disposed in fluid communication with the inlet of the second expansion coil of the heat exchanger means;
    (e) by-pass means disposed between the outlet of the cooling means and the inlet of the pump means for bypassing the reservoir means and delivering the solution directly from the outlet of the cooling means to the inlet of the second expansion coil of the heat exchanger means;
    (f) first valve means disposed in the bypass line between the outlet of the cooling means and the inlet of the second expansion coil of the heat exchanger means, wherein the first valve means opens to deliver the solution directly from the outlet of the cooling means to the inlet of the second expansion coil of the heat exchanger means, thereby bypassing the reservoir means: and
    (g) a connecting line disposed between the outlet of the cooling coil and the inlet of the reservoir, and a second valve disposed in the connecting line, wherein the second valve opens when the first valve closes to allow the solution to flow into the inlet of the reservoir.

9. A method for bypassing a reservoir in a secondary cooling loop system for use in a vapor compression air conditioning system of an automobile, comprising the steps of:
    (a) circulating a refrigerant through a first expansion coil of a heat exchanger, and circulating a cooling solution through a second expansion coil of the heat exchanger;
    (b) cooling the solution as it circulates through a cooling unit, wherein the cooling unit is disposed in fluid communication with the second expansion coil of the heat exchanger;
    (c) opening a first valve disposed in a connecting line disposed between the outlet of the cooling unit and the inlet of the second expansion coil of the heat exchanger to deliver the solution directly from the outlet of the cooling unit to the inlet of the second expansion coil of the heat exchanger, thereby bypassing the reservoir;

(d) circulating the solution from the by-pass line back to the inlet of the second expansion coil of the heat exchanger: and (e) closing a second valve disposed in a connecting line between the outlet of the cooling unit and the inlet of the reservoir.

10. The method of claim 9, further including sensing the temperature of the air in the body to be cooled and comparing the temperature in the body to be cooled to a predetermined temperature, and opening the first valve when the temperature in the body to be cooled is greater than the predetermined temperature.

11. The method of claim 9, further including closing the first valve and opening the second valve when the temperature in the body to be cooled is less than a predetermined temperature.

12. The method of claim 9, wherein the cooling solution is a glycol solution selected from the group consisting of ethylene glycol, propylene glycol, propane diol, or mixtures thereof with water.

13. The method of claim 9, wherein the refrigerant is circulated through a counter-current heat exchanger in one direction in a first expansion coil and a cooling solution flows there the counter-current heat exchanger in a second expansion coil the opposite direction.

14. The method of claim 9, wherein all of the solution is circulated through a single evaporator cooling unit.

15. The method of claim 9, wherein a portion of the solution is circulated from the heat exchanger through a front pump and a front cooling unit of a dual evaporator unit, and another portion of the solution is circulated through a rear cooling unit and a rear pump of the dual evaporator unit.

16. The method of claim 9 wherein said refrigerant is selected from the group consisting of: fluoroolefins, hydrofluorocarbons, hydrocarbons, dimethyl ether, CF3I, carbon dioxide, ammonia and mixtures thereof.

17. The method of claim 16, wherein the fluoroolefin is at least one compound selected from the group consisting of:

(i) fluoroolefins of the formula E— or Z—$R^1CH=CHR^2$, wherein $R^1$ and $R^2$ are, independently, $C_1$ to $C_6$ perfluoroalkyl groups;

(ii) cyclic fluoroolefins of the formula cyclo-[CX=CY(CZW)$_n$—], wherein X, Y, Z, and W, independently, are H or F, and n is an integer from 2 to 5; and (iii) fluoroolefins selected from the group consisting of: tetrafluoroethylene ($CF_2=CF_2$); hexafluoropropene ($CF_3CF=CF_2$); 1,2,3,3,3-pentafluoro-1-propene ($CHF=CFCF_3$); 1,1,3,3,3-pentafluoro-1-propene ($CF_2=CHCF_3$); 1,1,2,3,3-pentafluoro-1-propene ($CF_2=CFCHF_2$), 1,2,3,3-tetrafluoro-1-propene ($CHF=CFCHF_2$), 2,3,3,3-tetrafluoro-1-propene ($CH_2=CFCF_3$), 1,3,3,3-tetrafluoro-1-propene$CHF=CHCF_3$), 1,1,2,3-tetrafluoro-1-propene ($CF_2=CFCH_2F$), 1,1,3,3-tetrafluoro-1-propene ($CF_2=CHCHF_2$), 1,2,3,3-tetrafluoro-1-propene ($CHF=CFCHF_2$), 3,3,3-trifluoro-1-propene ($CH_2=CHCF_3$), 2,3,3-trifluoro-1-propene ($CHF_2CF=CH_2$); 1,1,2-trifluoro-1-propene ($CH_3CF=CF_2$); 1,2,3-trifluoro-1-propene ($CH_2FCF=CF_2$); 1,1,3-trifluoro-1-propene ($CH_2FCH=CF_2$); 1,3,3-trifluoro-1-propene ($CHF_2CH=CHF$); 1,1,1,2,3,4,4,4-octafluoro-2-butene ($CF_3CF=CFCF_3$); 1,1,2,3,3,4,4,4-octafluoro-1-butene ($CF_3CF_2CF=CF_2$); 1,1,1,2,4,4,4-heptafluoro-2-butene ($CF_3CF=CHCF_3$); 1,2,3,3,4,4,4-heptafluoro-1-butene ($CHF=CFCF_2CF_3$); 1,1,1,2,3,4,4-heptafluoro-2-butene ($CHF_2CF=CFCF_3$); 1,3,3,3-tetrafluoro-2-(trifluoromethyl)-1-propene (($CF_3)_2C=CHF$); 1,1,3,3,4,4,4-heptafluoro-1-butene ($CF_2=CHCF_2CF_3$); 1,1,2,3,4,4,4-heptafluoro-1-butene ($CF_2=CFCHFCF_3$); 1,1,2,3,3,4,4-heptafluoro-1-butene ($CF_2=CFCF_2CHF_2$); 2,3,3,4,4,4-hexafluoro-1-butene ($CF_3CF_2CF=CH_2$); 1,3,3,4,4,4-hexafluoro-1-butene ($CHF=CHCF_2CF_3$); 1,2,3,4,4,4-hexafluoro-1-butene ($CHF=CFCHFCF_3$); 1,2,3,3,4,4-hexafluoro-1-butene ($CHF=CFCF_2CHF_2$); 1,1,2,3,4,4-hexafluoro-2-butene ($CHF_2CF=CFCHF_2$); 1,1,1,2,3,4-hexafluoro-2-butene ($CH_2FCF=CFCF_3$); 1,1,1,2,4,4-hexafluoro-2-butene ($CHF_2CH=CFCF_3$); 1,1,1,3,4,4-hexafluoro-2-butene ($CF_3CH=CFCHF_2$); 1,1,2,3,3,4-hexafluoro-1-butene ($CF_2=CFCF_2CH_2F$); 1,1,2,3,4,4-hexafluoro-1-butene ($CF_2=CFCHFCHF_2$); 3,3,3-trifluoro-2-(trifluoromethyl)-1-propene ($CH_2=C(CF_3)_2$); 1,1,1,2,4-pentafluoro-2-butene ($CH_2FCH=CFCF_3$); 1,1,1,3,4-pentafluoro-2-butene ($CF_3CH=CFCH_2F$); 3,3,4,4,4-pentafluoro-1-butene ($CF_3CF_2CH=CH_2$); 1,1,1,4,4-pentafluoro-2-butene ($CHF_2CH=CHCF_3$); 1,1,1,2,3-pentafluoro-2-butene ($CH_3CF=CFCF_3$); 2,3,3,4,4-pentafluoro-1-butene ($CH_2=CFCF_2CHF_2$); 1,1,2,4,4-pentafluoro-2-butene ($CHF_2CF=CHCHF_2$); 1,1,2,3,3-pentafluoro-1-butene ($CH_3CF_2CF=CF_2$); 1,1,2,3,4-pentafluoro-2-butene ($CH_2FCF=CFCHF_2$); 1,1,3,3,3-pentafluoro-2-methyl-1-propene ($CF_2=C(CF_3)(CH_3)$); 2-(difluoromethyl)-3,3,3-trifluoro-1-propene ($CH_2=C(CHF_2)(CF_3)$); 2,3,4,4,4-pentafluoro-1-butene ($CH_2=CFCHFCF_3$); 1,2,4,4,4-pentafluoro-1-butene ($CHF=CFCH_2CF_3$); 1,3,4,4,4-pentafluoro-1-butene ($CHF=CHCHFCF_3$); 1,3,3,4,4-pentafluoro-1-butene ($CHF=CHCF_2CHF_2$); 1,2,3,4,4-pentafluoro-1-butene ($CHF=CFCHFCHF_2$); 3,3,4,4-tetrafluoro-1-butene ($CH_2=CHCF_2CHF_2$); 1,1-difluoro-2-(difluoromethyl)-1-propene ($CF_2=C(CHF_2)(CH_3)$); 1,3,3,3-tetrafluoro-2-methyl-1-propene ($CHF=C(CF_3)(CH_3)$); 3,3-difluoro-2-(difluoromethyl)-1-propene ($CH_2=C(CHF_2)_2$); 1,1,1,2-tetrafluoro-2-butene ($CF_3CF=CHCH_3$); 1,1,1,3-tetrafluoro-2-butene ($CH_3CF=CHCF_3$); 1,1,1,2,3,4,4,5,5,5-decafluoro-2-pentene ($CF_3CF=CFCF_2CF_3$); 1,1,2,3,3,4,4,5,5,5-decafluoro-1-pentene ($CF_2=CFCF_2CF_2CF_3$); 1,1,1,4,4,4-hexafluoro-2-(trifluoromethyl)-2-butene (($CF_3)_2C=CHCF_3$); 1,1,1,2,4,4,5,5,5-nonafluoro-2-pentene ($CF_3CF=CHCF_2CF_3$); 1,1,1,3,4,4,5,5,5-nonafluoro-2-pentene ($CF_3CH=CFCF_2CF_3$); 1,2,3,3,4,4,5,5,5-nonafluoro-1-pentene ($CHF=CFCF_2CF_2CF_3$); 1,1,3,3,4,4,5,5,5-nonafluoro-1-pentene ($CF_2=CHCF_2CF_2CF_3$); 1,1,2,3,3,4,4,5,5-nonafluoro-1-pentene ($CF_2=CFCF_2CF_2CHF_2$); 1,1,2,3,4,4,5,5,5-nonafluoro-2-pentene ($CHF_2CF=CFCF_2CF_3$); 1,1,1,2,3,4,4,5,5-nonafluoro-2-pentene ($CF_3CF=CFCF_2CHF_2$); 1,1,1,2,3,4,5,5,5-nonafluoro-2-pentene ($CF_3CF=CFCHFCF_3$); 1,2,3,4,4,4-hexafluoro-3-(trifluoromethyl)-1-butene ($CHF=CFCF(CF_3)_2$); 1,1,2,4,4,4-hexafluoro-3-(trifluoromethyl)-1-butene ($CF_2=CFCH(CF_3)_2$); 1,1,1,4,4,4-hexafluoro-2-(trifluoromethyl)-2-butene ($CF_3CH=C(CF_3)_2$); 1,1,3,4,4,4-hexafluoro-3-(trifluoromethyl)-1-butene ($CF_2=CHCF(CF_3)_2$); 2,3,3,4,4,5,5,5-octafluoro-1-pentene ($CH_2=CFCF_2CF_2$ CF$_3$); 1,2,3,3,4,4,5,5-octafluoro-1-pentene (CHF=CFCF$_2$CF$_2$CHF$_2$); 3,3,4,4,4-pentafluoro-2-(trifluoromethyl)-1-butene (CH$_2$=C(CF$_3$)CF$_2$CF$_3$); 1,1,4,4,4-pentafluoro-3-(trifluoromethyl)-1-butene (CF$_2$=CHCH(CF$_3$)$_2$); 1,3,4,4,4-pentafluoro-3-(trifluoromethyl)-1-butene (CHF=CHCF(CF$_3$)$_2$); 1,1,4,4,4-pentafluoro-2-(trifluoromethyl)-1-butene (CF$_2$=C(CF$_3$)CH$_2$CF$_3$); 3,4,4,4-tetrafluoro-3-(trifluoromethyl)-1-butene ((CF$_3$)$_2$CFCH=CH$_2$); 3,3,4,4,5,5,5-heptafluoro-1-pentene (CF$_3$CF$_2$CF$_2$CH=CH$_2$); 2,3,3,4,4,5,5-heptafluoro-1-pentene (CH$_2$=CFCF$_2$CF$_2$CHF$_2$); 1,1,3,3,5,5,5-heptafluoro-1-butene (CF$_2$=CHCF$_2$CH$_2$CF$_3$); 1,1,1,2,4,4,4-heptafluoro-3-methyl-2-butene (CF$_3$CF=C(CF$_3$)(CH$_3$)); 2,4,4,4-tetrafluoro-3-(trifluoromethyl)-1-butene (CH$_2$=CFCH(CF$_3$)$_2$); 1,4,4,4-tetrafluoro-3-(trifluoromethyl)-1-butene (CHF=CHCH(CF$_3$)$_2$); 1,1,1,4-tetrafluoro-2-(trifluoromethyl)-2-butene (CH$_2$FCH=C(CF$_3$)$_2$); 1,1,1,3-tetrafluoro-2-(trifluoromethyl)-2-butene (CH$_3$CF=C(CF$_3$)$_2$); 1,1,1-trifluoro-2-(trifluoromethyl)-2-butene ((CF$_3$)$_2$C=CHCH$_3$); 3,4,4,5,5,5-hexafluoro-2-pentene (CF$_3$CF$_2$CF=CHCH$_3$); 1,1,1,4,4,4-hexafluoro-2-methyl-2-butene (CF$_3$C(CH$_3$)=CHCF$_3$); 3,3,4,5,5,5-hexafluoro-1-pentene (CH$_2$=CHCF$_2$CHFCF$_3$); 4,4,4-trifluoro-2-(trifluoromethyl)-1-butene (CH$_2$=C(CF$_3$)CH$_2$CF$_3$); 1,1,2,3,3,4,4,5,5,6,6,6-dodecafluoro-1-hexene (CF$_3$(CF$_2$)$_3$CF=CF$_2$); 1,1,1,2,2,3,4,5,5,6,6,6-dodecafluoro-3-hexene (CF$_3$CF$_2$CF=CFCF$_2$CF$_3$); 1,1,1,4,4,4-hexafluoro-2,3-bis(trifluoromethyl)-2-butene ((CF$_3$)$_2$C=C(CF$_3$)$_2$); 1,1,1,2,3,4,5,5,5-nonafluoro-4-(trifluoromethyl)-2-pentene ((CF$_3$)$_2$CFCF=CFCF$_3$); 1,1,1,4,4,5,5,5-octafluoro-2-(trifluoromethyl)-2-pentene ((CF$_3$)$_2$C=CHC$_2$F$_5$); 1,1,1,3,4,5,5,5-octafluoro-4-(trifluoromethyl)-2-pentene ((CF$_3$)$_2$CFCF=CHCF$_3$); 3,3,4,4,5,5,6,6,6-nonafluoro-1-hexene (CF$_3$CF$_2$CF$_2$CF$_2$CH=CH$_2$); 4,4,4-trifluoro-3,3-bis(trifluoromethyl)-1-butene (CH$_2$=CHC(CF$_3$)$_3$); 1,1,1,4,4,4-hexafluoro-3-methyl-2-(trifluoromethyl)-2-butene ((CF$_3$)$_2$C=C(CH$_3$)(CF$_3$)); 2,3,3,5,5,5-hexafluoro-4-(trifluoromethyl)-1-pentene (CH$_2$=CFCF$_2$CH(CF$_3$)$_2$); 1,1,1,2,4,4,5,5,5-nonafluoro-3-methyl-2-pentene (CF$_3$CF=C(CH$_3$)CF$_2$CF$_3$); 1,1,1,5,5,5-hexafluoro-4-(trifluoromethyl)-2-pentene (CF$_3$CH=CHCH(CF$_3$)$_2$); 3,4,4,5,5,6,6,6-octafluoro-2-hexene (CF$_3$CF$_2$CF$_2$CF=CHCH$_3$); 3,3,4,4,5,5,6,6-octafluoro1-hexene (CH$_2$=CHCF$_2$CF$_2$CHF$_2$); 1,1,1,4,4-pentafluoro-2-(trifluoromethyl)-2-pentene ((CF$_3$)$_2$C=CHCF$_2$CH$_3$); 4,4,5,5,5-pentafluoro-2-(trifluoromethyl)-1-pentene (CH$_2$=C(CF$_3$)CH$_2$C$_2$F$_5$); 3,3,4,4,5,5,5-heptafluoro-2-methyl-1-pentene (CF$_3$CF$_2$CF$_2$C(CH$_3$)=CH$_2$); 4,4,5,5,6,6,6-heptafluoro-2-hexene (CF$_3$CF$_2$CF$_2$CH=CHCH$_3$); 4,4,5,5,6,6,6-heptafluoro-1-hexene (CH$_2$=CHCH$_2$CF$_2$C$_2$F$_5$); 1,1,1,2,2,3,4-heptafluoro-3-hexene (CF$_3$CF$_2$CF=CFC$_2$H$_5$); 4,5,5,5-tetrafluoro-4-(trifluoromethyl)-1-pentene (CH$_2$=CHCH$_2$CF(CF$_3$)$_2$); 1,1,1,2,5,5,5-heptafluoro-4-methyl-2-pentene (CF$_3$CF=CHCH(CF$_3$)(CH$_3$)); 1,1,1,3-tetrafluoro-2-(trifluoromethyl)-2-pentene ((CF$_3$)$_2$C=CFC$_2$H$_5$); 1,1,1,2,3,4,4,5,5,6,6,7,7,7-tetradecafluoro-2-heptene (CF$_3$CF=CFCF$_2$CF$_2$C$_2$F$_5$); 1,1,1,2,2,3,4,5,5,6,6,7,7,7-tetradecafluoro-3-heptene (CF$_3$CF$_2$CF=CFCF$_2$C$_2$F$_5$); 1,1,1,3,4,4,5,5,6,6,7,7,7-tridecafluoro-2-heptene (CF$_3$CH=CFCF$_2$CF$_2$C$_2$F$_5$); 1,1,1,2,4,4,5,5,6,6,7,7,7-tridecafluoro-2-heptene (CF$_3$CF=CHCF$_2$CF$_2$C$_2$F$_5$); 1,1,1,2,2,4,5,5,6,6,7,7,7-tridecafluoro-3-heptene (CF$_3$CF$_2$CH=CFCF$_2$C$_2$F$_5$); and 1,1,1,2,2,3,5,5,6,6,7,7,7-tridecafluoro-3-heptene (CF$_3$CF$_2$CF=CHCF$_2$C$_2$F$_5$).

18. The method of claim 16, wherein the hydrofluorocarbons are selected from the group consisting of fluoromethane (CH$_3$F, HFC-41), difluoromethane (CH$_2$F$_2$, HFC-32), trifluoromethane (CHF$_3$, HFC-23), pentafluoroethane (CF$_3$CHF$_2$, HFC-125), 1,1,2,2-tetrafluoroethane (CHF$_2$CHF$_2$, HFC-134), 1,1,1,2-tetrafluoroethane (CF$_3$CH$_2$F, HFC-134a), 1,1,1-trifluoroethane (CF$_3$CH$_3$, HFC-143a), 1,1-difluoroethane (CHF$_2$CH$_3$, HFC-152a), fluoroethane (CH$_3$CH$_2$F, HFC-161), 1,1,1,2,2,3,3-heptafluoropropane (CF$_3$CF$_2$CHF$_2$, HFC-227ca), 1,1,1,2,3,3,3-heptafluoropropane (CF$_3$CHFCF$_3$, HFC-227ea), 1,1,2,2,3,3,-hexafluoropropane (CHF$_2$CF$_2$CHF$_2$, HFC-236ca), 1,1,1,2,2,3-hexafluoropropane (CF$_3$CF$_2$CH$_2$F, HFC-236cb), 1,1,1,2,3,3-hexafluoropropane (CF$_3$CHFCHF$_2$, HFC-236ea), 1,1,1,3,3,3-hexafluoropropane (CF$_3$CH$_2$CF$_3$, HFC-236fa), 1,1,2,2,3-pentafluoropropane (CHF$_2$CF$_2$CH$_2$F, HFC-245ca), 1,1,1,2,2-pentafluoropropane (CF$_3$CF$_2$CH$_3$, HFC-245cb), 1,1,2,3,3-pentafluoropropane (CHF$_2$CHFCHF$_2$, HFC-245ea), 1,1,1,2,3-pentafluoropropane (CF$_3$CHFCH$_2$F, HFC-245eb), 1,1,1,3,3-pentafluoropropane (CF$_3$CH$_2$CHF$_2$, HFC-245fa), 1,2,2,3-tetrafluoropropane (CH$_2$FCF$_2$CH$_2$F, HFC-254ca), 1,1,2,2-tetrafluoropropane (CHF$_2$CF$_2$CH$_3$, HFC-254cb), 1,1,2,3-tetrafluoropropane (CHF$_2$CHFCH$_2$F, HFC-254ea), 1,1,1,2-tetrafluoropropane (CF$_3$CHFCH$_3$, HFC-254eb), 1,1,3,3-tetrafluoropropane (CHF$_2$CH$_2$CHF$_2$, HFC-254fa), 1,1,1,3-tetrafluoropropane (CF$_3$CH$_2$CH$_2$F, HFC-254fb), 1,1,1-trifluoropropane (CF$_3$CH$_2$CH$_3$, HFC-263fb), 2,2-difluoropropane (CH$_3$CF$_2$CH$_3$, HFC-272ca), 1,2-difluoropropane (CH$_2$FCHFCH$_3$, HFC-272ea), 1,3-difluoropropane (CH$_2$FCH$_2$CH$_2$F, HFC-272fa), 1,1-difluoropropane (CHF$_2$CH$_2$CH$_3$, HFC-272fb), 2-fluoropropane (CH$_3$CHFCH$_3$, HFC-281ea), 1-fluoropropane (CH$_2$FCH$_2$CH$_3$, HFC-281fa), 1,1,2,2,3,3,4,4-octafluorobutane (CHF$_2$CF$_2$CF$_2$CHF$_2$, HFC-338 pcc), 1,1,1,2,2,4,4,4-octafluorobutane (CF$_3$CH$_2$CF$_2$CF$_3$, HFC-338mf), 1,1,1,3,3-pentafluorobutane (CF$_3$CH$_2$CHF$_2$, HFC-365mfc), 1,1,1,2,3,4,4,5,5,5-decafluoropentane (CF$_3$CHFCHFCF$_2$CF$_3$, HFC-43-10mee), 1,1,1,2,2,3,4,5,5,6,6,7,7,7-tetradecafluoroheptane (CF$_3$CF$_2$CHFCHFCF$_2$CF$_2$CF$_3$, HFC-63-14mee), and mixtures thereof.

19. The method of claim 16, wherein the hydrocarbons are selected from the group consisting of: propane, n-butane, isobutane, cyclobutane, n-pentane, 2-methylbutane, 2,2-dimethylpropane, cyclopentane, n-hexane, 2-methylpentane, 2,2-dimethylbutane, 2,3-dimethylbutane, 3-methylpentane, cyclohexane, n-heptane, cycloheptane, and mixtures thereof.

* * * * *